(12) United States Patent
Moore

(10) Patent No.: US 10,737,607 B2
(45) Date of Patent: Aug. 11, 2020

(54) MOBILE CART FOR SPRAY DISPENSING

(71) Applicant: Richard I. Moore, Blue Bell, PA (US)

(72) Inventor: Richard I. Moore, Blue Bell, PA (US)

( * ) Notice: Subject to any disclaimer, the term of this patent is extended or adjusted under 35 U.S.C. 154(b) by 284 days.

(21) Appl. No.: 15/960,018

(22) Filed: Apr. 23, 2018

(65) Prior Publication Data

US 2018/0304795 A1    Oct. 25, 2018

Related U.S. Application Data

(60) Provisional application No. 62/489,134, filed on Apr. 24, 2017.

(51) Int. Cl.
*E04D 15/06* (2006.01)
*E04D 15/07* (2006.01)
*B60P 3/22* (2006.01)

(52) U.S. Cl.
CPC ............ *B60P 3/2215* (2013.01); *E04D 15/06* (2013.01); *E04D 15/07* (2013.01); *B60P 3/2205* (2013.01)

(58) Field of Classification Search
CPC ...... B60P 3/2215; B60P 3/2205; E04D 15/06; E04D 15/07
USPC ...................................................... 280/47.24
See application file for complete search history.

(56) References Cited

U.S. PATENT DOCUMENTS

| | | |
|---|---|---|
| 515,273 A | 2/1894 | Becker |
| 1,815,825 A | 7/1931 | Bates |
| 2,766,063 A | 10/1956 | Greely |
| 3,278,218 A * | 10/1966 | Jean-Pierre ............ B62B 3/104 294/81.2 |
| 4,981,412 A | 1/1991 | Hawkins |
| 5,678,976 A * | 10/1997 | Rodriguez ............. B62B 1/264 414/448 |
| 5,716,183 A | 2/1998 | Gibson et al. |
| 6,220,526 B1 | 4/2001 | Johnson |
| 7,178,695 B1 * | 2/2007 | Malenfant ............... E01C 23/20 222/166 |
| 7,438,084 B2 | 10/2008 | Trettin et al. |
| 8,061,889 B2 | 11/2011 | Mattson et al. |
| 8,113,385 B2 | 2/2012 | Choiniere et al. |

(Continued)

FOREIGN PATENT DOCUMENTS

CA    2708632 A1    1/2012

OTHER PUBLICATIONS

Int'l Search Report and Written Opinion dated May 11, 2017 in Int'l Application No. PCT/US2016/068520.

(Continued)

*Primary Examiner* — Paul N Dickson
*Assistant Examiner* — Hilary L Johns
(74) *Attorney, Agent, or Firm* — Panitch Schwarze Belisario & Nadel LLP

(57) ABSTRACT

A mobile cart includes a frame; a front pair of wheels and a rear pair of wheels. At least one carrier is movably attached to the frame and configured to receive a drum thereon. The carrier is movable between a transport position, wherein the carrier is supported upon the frame, and a loading position, wherein the carrier is oriented generally upright. A corresponding at least one motorized drive member is attached to the frame and to the carrier, the motorized drive member being configured, when actuated, to move the corresponding carrier between the transport position and the loading position.

20 Claims, 7 Drawing Sheets

(56) References Cited

U.S. PATENT DOCUMENTS

| | | | |
|---|---|---|---|
| 8,132,693 B2 | 3/2012 | Choiniere et al. | |
| 8,167,170 B2 | 5/2012 | Choiniere et al. | |
| 8,342,372 B2 | 1/2013 | Choiniere et al. | |
| 8,474,658 B2 | 7/2013 | Choiniere et al. | |
| 8,794,644 B2 | 8/2014 | Chen et al. | |
| 9,884,637 B2 * | 2/2018 | McFarland | B62B 1/12 |
| 2006/0196548 A1 | 9/2006 | Trettin et al. | |
| 2007/0045289 A1 | 3/2007 | Kott et al. | |
| 2009/0314555 A1 * | 12/2009 | Meyers | B62D 51/04 |
| | | | 180/19.1 |
| 2015/0197261 A1 * | 7/2015 | Moore | B62B 1/16 |
| | | | 280/47.24 |
| 2015/0203137 A1 * | 7/2015 | Lang | B62B 3/04 |
| | | | 414/469 |
| 2015/0314309 A1 | 11/2015 | Abbale | |
| 2016/0114823 A1 * | 4/2016 | Moore | B62B 5/0003 |
| | | | 280/47.24 |
| 2016/0129460 A1 * | 5/2016 | Moore | B62B 5/0003 |
| | | | 280/830 |
| 2016/0129826 A1 * | 5/2016 | Yielding | B60P 3/2215 |
| | | | 280/839 |
| 2018/0171274 A1 * | 6/2018 | Deal | C12C 11/00 |

OTHER PUBLICATIONS

Office Action dated May 26, 2016 in U.S. Appl. No. 14/980,698 by Moore.
Office Action dated Jul. 28, 2016 in U.S. Appl. No. 15/195,359 by Moore.
Office Action dated Dec. 15, 2016 in U.S. Appl. No. 15/195,359, by Hilary Lynn.

* cited by examiner

MOBILE CART FOR SPRAY DISPENSING

CROSS-REFERENCE TO RELATED APPLICATIONS

This application claims priority to U.S. Provisional Patent Application No. 62/489,134, filed on Apr. 24, 2017, entitled "Mobile Cart for Spray Dispensing," the entire contents of which are incorporated by reference herein.

BACKGROUND OF THE INVENTION

In the roofing industry, replacing an old roof, re-roofing or installing a new roof, requires a new roofing layer to be laid down. Multiple different materials are required to lay down a new roofing layer, such as, for example, roofing adhesive (e.g., a foam adhesive) and insulation (e.g., spray foam insulation). Spray foam insulation is a mixture of components that form an expanding foam upon mixing that is sprayed onto roof tiles, concrete slabs, or the like.

Roofing adhesive and spray foam insulation are generally sold in a 5 gallon bag-in-a-box, a 15 gallon drum, or a 55 gallon drum. The 15 or 55 gallon drums are preferred to the 5 gallon bag-in-a-box, both from a cost vantage (price per gallon) and because roofing jobs tend to require a large amount of adhesive and insulation. For example, the price per gallon of the adhesive or insulation in a 55 gallon drum reaches up to 30% less than the price per gallon of the same material in the 5 gallon bag-in-a-box. One drawback of the drums, however, is their weight. A 15 gallon drum weighs approximately 150 lbs. and the 55 gallon drum weighs much more. Thus, transporting the drums to an upper level, or onto a roof, can be extremely exhausting, challenging and potentially unsafe.

Multiple different tools are also required to lay down a new roofing layer. Equipment includes, for example, a mixer, a dispenser, a spray gun, an air compressor and a mobile power source, e.g., a generator. This equipment is also heavy and cumbersome to transport to an upper level or onto a roof.

The present invention addresses the challenges associated with safely transporting roofing adhesive and spray foam insulation drums and the accompanying equipment. For example, it is desirable to provide a mobile cart than can safely receive, carry and transport the necessary drums and equipment for roofing and insulation.

BRIEF SUMMARY OF THE INVENTION

Briefly stated, one aspect of the present invention is directed to a mobile cart. The mobile cart comprises a frame; a rotatable and swivelable front pair of wheels attached to and supporting the frame upon an underlying surface; and a rotatable rear pair of wheels attached to and supporting the frame upon the underlying surface, the front pair of wheels and the rear pair of wheels defining a wheelbase therebetween. At least one carrier is movably attached to the frame and configured to receive a drum thereon. The carrier comprises a pair of substantially parallel and spaced apart elongate side bars, the side bars each defining a length substantially equal to a length of the drum. At least one generally arcuate cross bar extends at least between the side bars, a curvature of the arcuate cross bar generally complementing a contour of the drum, and at least one support member projects from a base end of the carrier to support a standing vertical drum thereon. The carrier is movable between a transport position, wherein the carrier is supported upon the frame and the side bars are oriented substantially parallel to the underlying surface, and a loading position, wherein the carrier is oriented generally upright and the side bars thereof are oriented substantially perpendicular to the underlying surface. A corresponding at least one motorized drive member is attached to the frame and to the carrier, the motorized drive member being configured, when actuated, to move the corresponding carrier between the transport position and the loading position.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings a preferred embodiment of the mobile cart which is presently preferred. It should be understood, however, that the invention is not limited to the precise arrangements and instrumentalities shown. In the drawings.

DETAILED DESCRIPTION OF THE INVENTION

Figure 1:
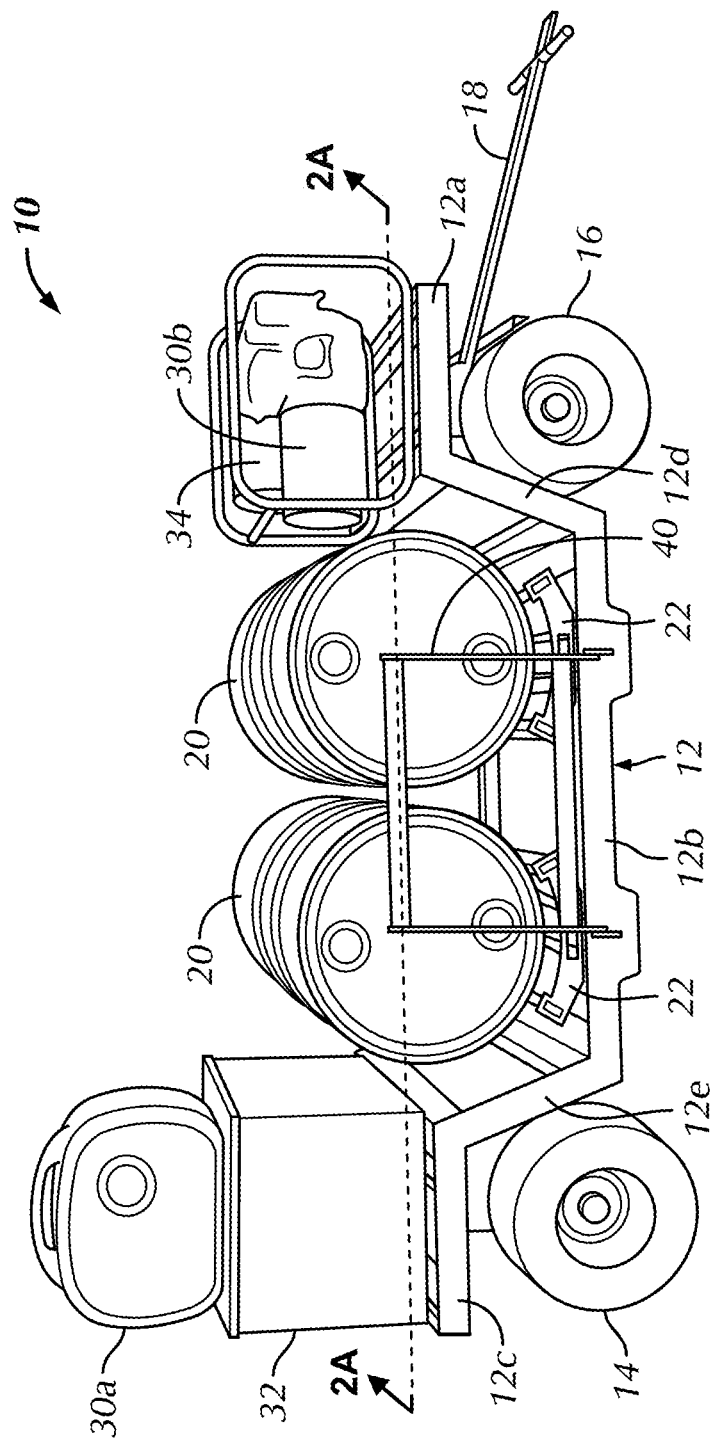
FIG. 1 is a left side perspective view of a mobile cart in accordance with an embodiment of the present invention, with 55 gallon drums carried by cart.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the mobile cart and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be noted that the terms "first," "second," "third" and the like may be used herein to modify various elements. These modifiers do not imply a spatial, sequential, or hierarchical order to the modified elements unless specifically stated. It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-5, the present application is directed to a mobile cart, generally designated with reference numeral 10. As shown in FIG. 1, the cart 10 includes a frame, i.e., chassis, 12, having a rear pair of wheels 14 and a front pair of wheels 16 extending downwardly therefrom and supporting the frame 12 atop an underlying surface. The rear wheels 14 are connected to the frame 12 in a manner well understood by those of ordinary skill in the art, such that the wheels 14 solely rotate about a common central axis extending therebetween. The front wheels 16 are also connected to the frame 12 in a manner well understood by those of ordinary skill in the art, such that the wheels 16 both rotate about a common central axis extending therebetween, and are also able to swivel together about a central axis therebetween, extending in a direction perpendicular to the underlying surface. Accordingly, the front wheels 16 are the steering wheels of the cart 10. The frame 12 also includes a forwardly extending cart handle 18 for moving and maneuvering the cart 10. The handle 18 include a cross bar 18a (FIG. 3A), which is engageable with the front wheels 16, by lowering the handle 18, to operate as a brake for the cart 10. As should be understood, however, the cart 10 may employ additional or alternative braking means currently known or that later become known. As also should be understood, the handle 18 may be connectable to a vehicle (e.g., truck, tractor, etc.), for towing/pulling of the cart 10.

The rear wheels 14 define a rear track, i.e., the spacing between the rear wheels 14, and the front wheels 16 define a front track, i.e., the spacing between the front wheels 16. In the illustrated embodiment, as shown best in FIG. 5, the rear track of the cart 10 is wider than the front track. As should be understood, the wider rear track reduces weight transfer between the two rear wheels 14, and, therefore, increases the stability of the cart 10, reducing the susceptibility of the cart 10 to tip over, e.g., while turning the cart 10.

Figure 2A:
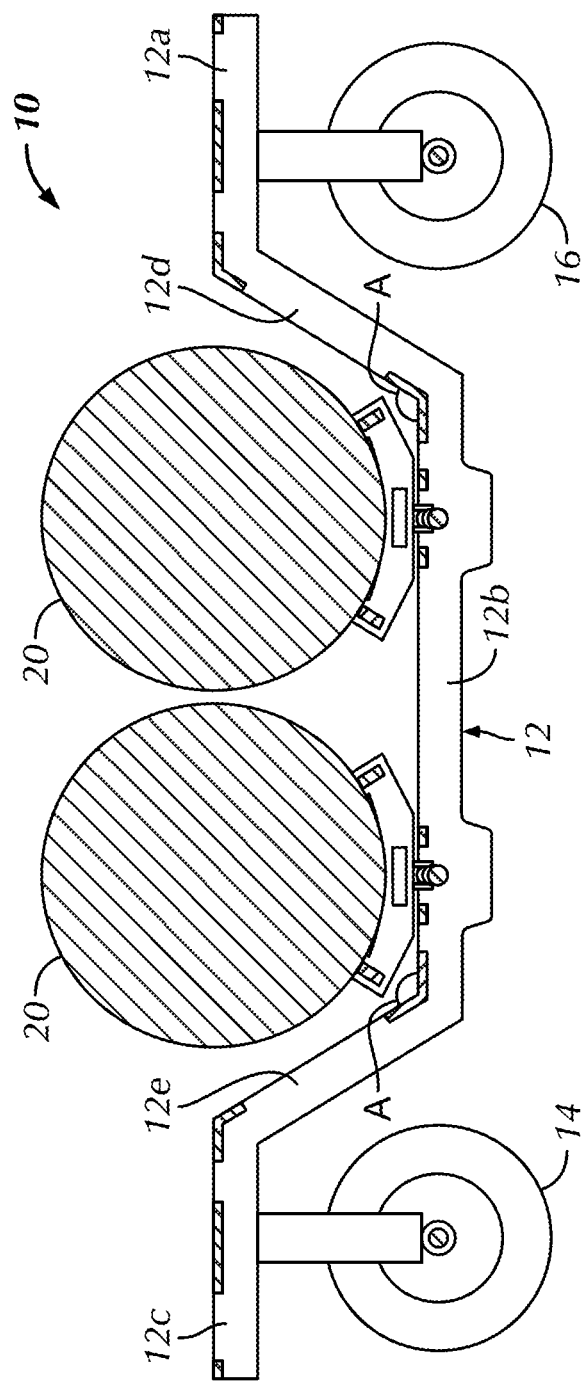
FIG. 2A is a cross-sectional view of the mobile cart of FIG. 1, taken along sectional line 2A-2A.
Figure 2B:
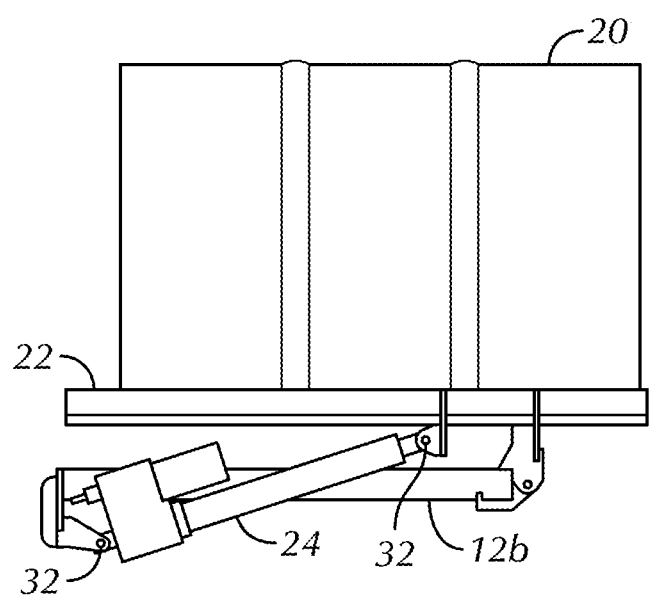
FIG. 2B is a fragmentary, front elevation view of a carrier of the mobile cart of FIG. 1, supporting a drum thereon in a horizontal, transport position of the carrier.
Figure 3A:
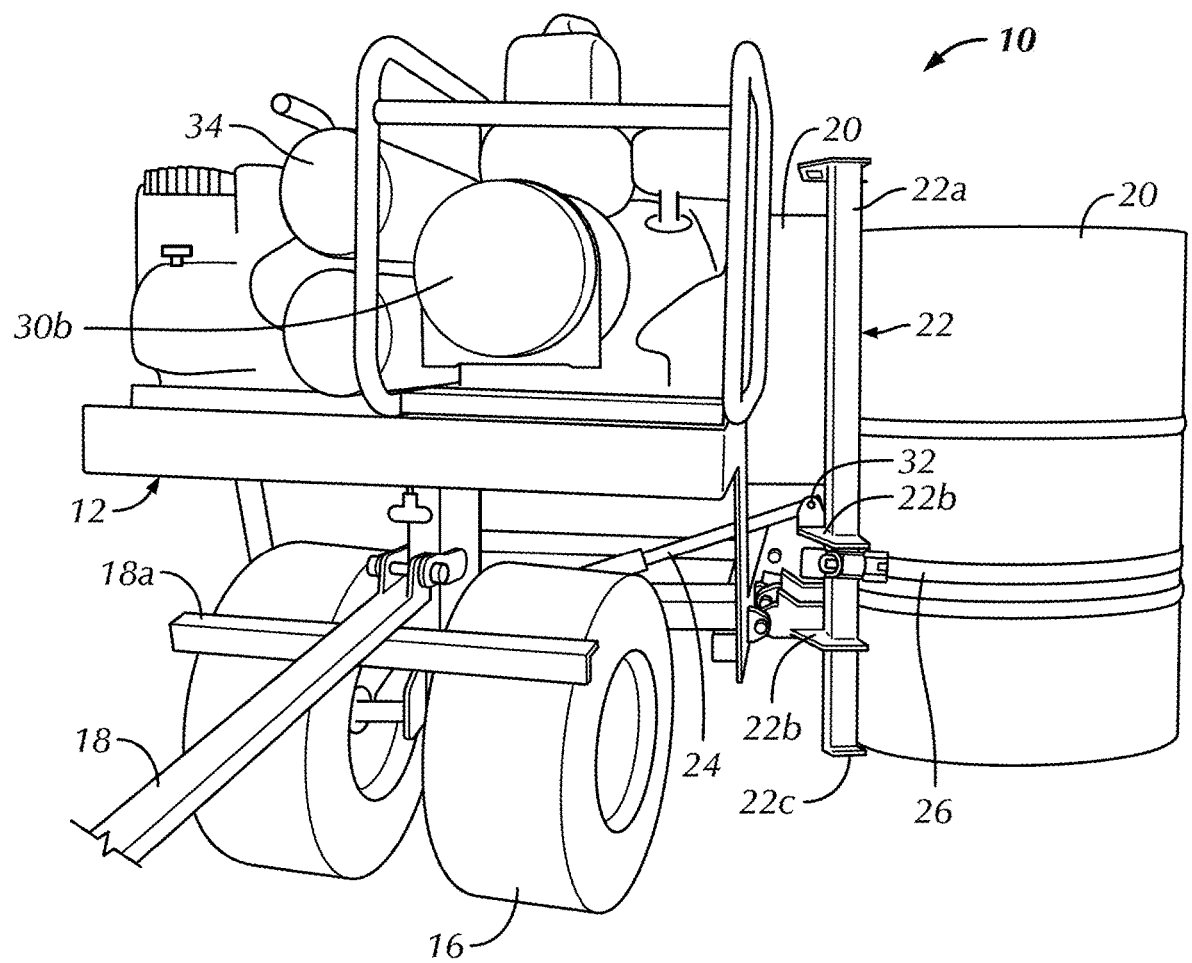
FIG. 3A is a front and right side perspective view of the mobile cart of FIG. 1, with the carrier of the mobile cart oriented in an upright, loading position thereof.
Figure 3B:
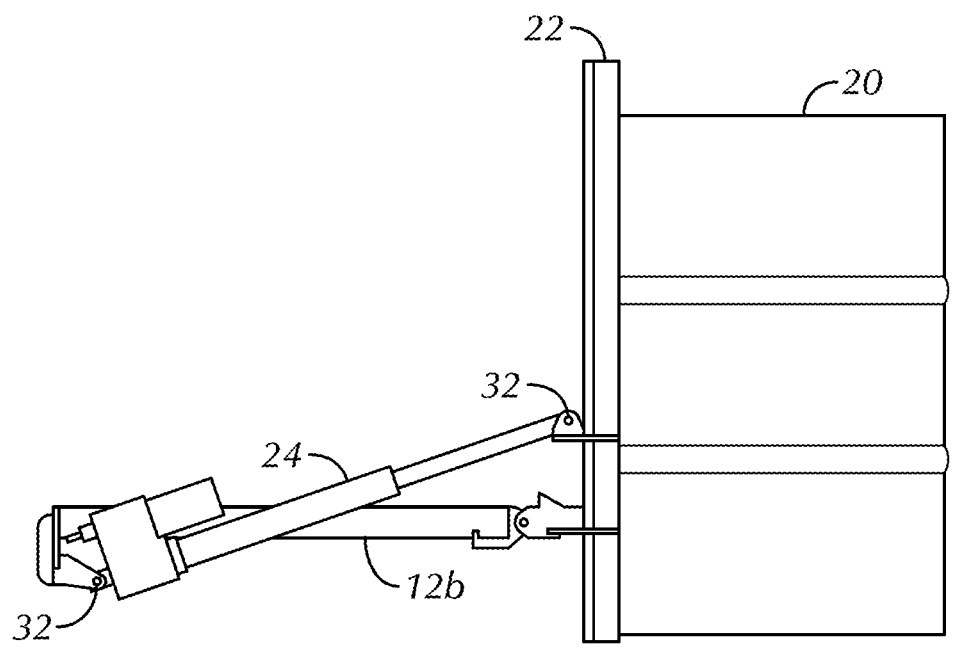
FIG. 3B is a fragmentary, front elevation view of the carrier of the mobile cart of FIG. 1, with a drum loaded thereon in an upright, loading position of the carrier.
Figure 4:
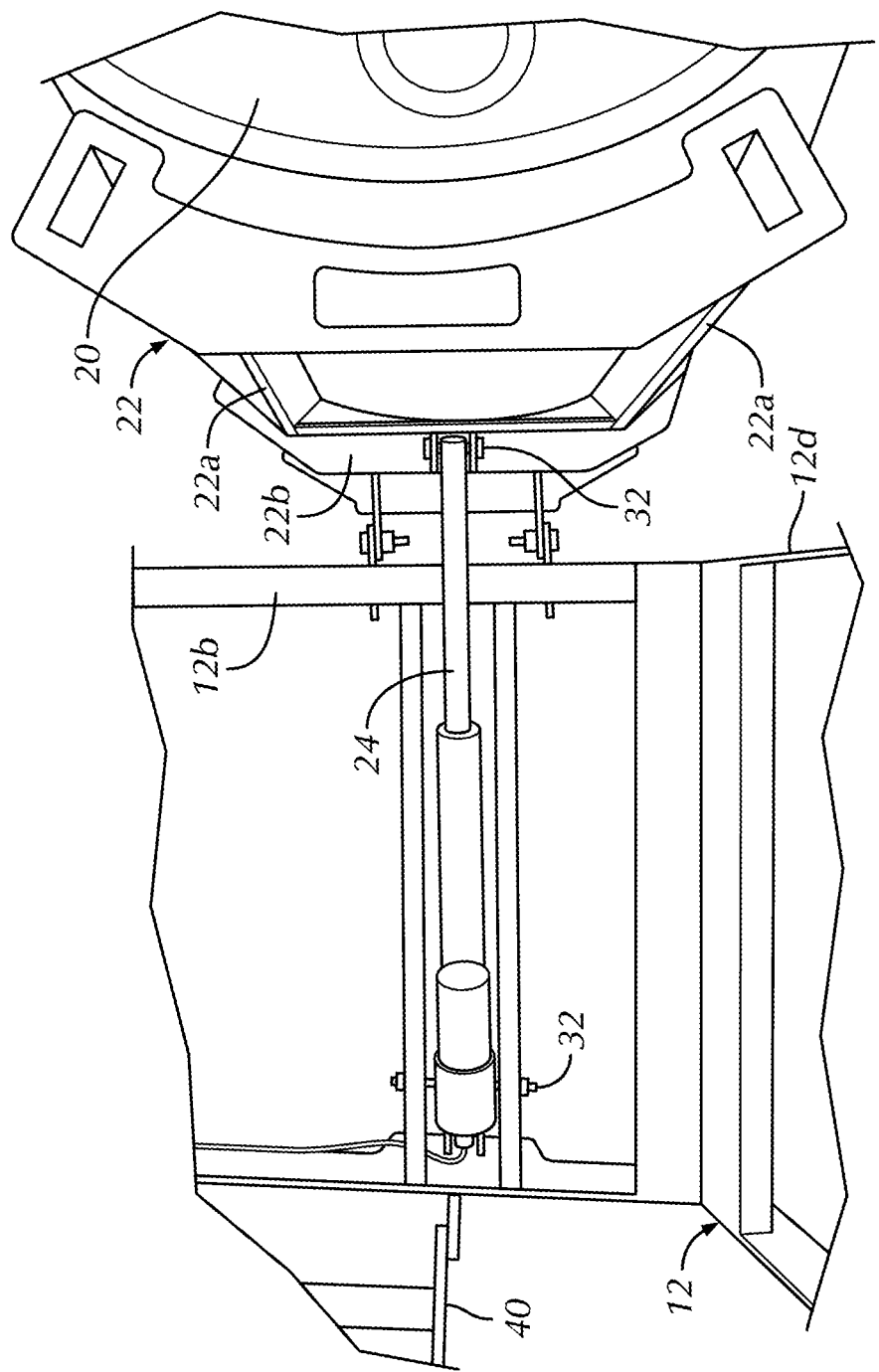
FIG. 4 is a fragmentary top plan view of the carrier of the mobile cart of FIG. 1, oriented in the upright, loading position thereof, and a motorized carrier driving member connected thereto.

As shown best in FIGS. 1 and 2A, the frame 12 defines three substantially planar sections 12a, 12b, 12c oriented in series. The front and rear sections 12a, 12c extend in substantially the same plane, i.e., at substantially the same elevation. In the illustrated embodiment, each of the front and rear sections 12a, 12c is substantially rectangular in shape, but the disclosure is not so limited. For example, without limitation, the front and rear sections 12a, 12c may alternatively define curved corners to minimize the propensity for injury to a user or damage to another object in a collision therewith. In the illustrated embodiment, the front and rear sections 12a, 12c are also substantially the same size, but the disclosure is not so limited. In the illustrated embodiment, the front wheels 16 are mounted to an underside of the front section 12a and extend downwardly therefrom, and the rear wheels 14 are mounted to an underside of the rear section 12c and extend downwardly therefrom. The front and rear wheels 16, 14 extend downwardly from the sections 12a, 12c to an approximately even elevational level, such that the cart 10 rests in a substantially level horizontal orientation.

Connected between the front and rear sections 12a, 12c of the frame 12 is a middle section 12b extending in a plane substantially parallel to, but at a lower elevation than, the plane of the front and rear sections 12a, 12c. Thus, the middle section 12b is closer to the support surface underlying the cart 10, i.e., the ground surface, and defines a lower center of gravity than the front and rear sections 12a, 12c. The lowered center of gravity of the middle section 12b reduces weight transferability, thereby further minimizing the propensity of the cart to tip over. In the illustrated embodiment, as shown best in FIG. 2A, the middle section 12b is lowered a set extent relative to the front and rear sections 12a, 12c, such that a central horizontal plane of a 55 gallon drum 20 supported atop the middle section 12b (as explained in further detail below) is generally coplanar with the plane of the front and rear sections 12a, 12c. In the illustrated embodiment, the middle section 12b is also larger than each of the front and rear sections 12a, 12c, but the disclosure is not so limited.

As shown in FIGS. 1 and 2A, a pair of frame legs 12d, 12e connect the middle section 12b with the front and rear sections 12a, 12c. Each frame leg 12d, 12e, extends upwardly from an opposing end of the middle section 12b to a respective front or rear section 12a, 12c, at an obtuse angle A relative to the middle section 12b. However, as should be recognized by those of ordinary skill in the art, the frame legs 12d, 12e may alternatively extend substantially perpendicularly from the middle section 12b. In the illustrated embodiment, the frame 12, including the front, middle and rear sections 12a, 12b, 12c, and the frame legs 12d, 12e, is integrally, i.e., monolithically, formed, but the disclosure is not so limited. For example, the different sections can be separately formed, and then attached to one another, e.g., via welding, to manufacture the cart 10. In one embodiment, the frame 12 is constructed of steel, e.g., 10 gauge steel. As should be understood by those of ordinary skill in the art, however, the disclosure is not so limited, and the frame 12 may be constructed of alternative materials sufficiently rigid to adequately support the materials and equipment described herein.

The middle section 12b is dimensioned to support at least one 55 gallon drum 20 thereon in a stable manner, as will be described in further detail below. In the illustrated embodiment, the middle section 12b is dimensioned to support two 55 gallon drums 20 thereon, placed side-by-side. Accordingly, the middle section 12b is also capable of supporting smaller drums, other containers, or any combination of the above, such as, for example, a 15 gallon drum (not shown) and a 5 gallon bag-in-a-box (not shown) containing different materials, e.g., adhesive or spray foam insulation.

To support 55 gallon drums 20, the middle section 12b includes at least one receiving carrier 22. In the illustrated embodiment, the middle section 12b includes two adjacent carriers 22 extending perpendicularly to the wheelbase of the cart 10, but the disclosure is not so limited. For the sake of brevity, all description of the carrier 22, and of any components operative therewith, is applicable to any of the carriers 22 of the cart 10.

As shown in FIGS. 3A-5, each carrier 22 comprises a pair of substantially parallel elongate side bars 22a. The elongate side bars 22a extend in a plane substantially parallel to a longitudinal axis of a 55 gallon drum 20, when supporting the drum 20, and are of generally the same length as a 55 gallon drum 20. A plurality of spaced apart, generally arcuate cross bars 22b extend between (and may extend beyond) the side bars 22a. Together, the side bars 22a and the cross bars 22b are configured to generally cradle a 55 gallon drum 20 supported on the carrier 22. The curvature of the cross bars 22b generally follows, i.e., complements, the contour of a 55 gallon drum 20. A pair of feet 22c project substantially perpendicularly from a base end of the side bars 22a to support a standing vertical drum 20 thereon (FIG. 3A), but the disclosure is not so limited. As should be understood, for example, a bracket or plate (not shown) may alternatively extend from the base end of the side bars 22a to support a standing vertical drum 20 thereon.

In order to safely and easily load a drum 20 onto a carrier 22, the carrier 22 is movable, e.g., pivotable, between a generally horizontal "transport" or "carry" position (FIGS. 1-2B) and a generally upright "loading" position (FIGS. 3A-5). In the horizontal, transport position, the carrier 22 is oriented such that the side bars 22a extend across (generally perpendicularly to the cart wheelbase), and rest atop, the middle section 12b of the frame 12. Thus, in the horizontal, transport position, the side bars 22a extend in a plane substantially parallel to the support surface underlying the cart 10, and the feet 22c extend in a plane substantially perpendicular to the support surface.

In the upright, loading position, the carrier 22 is oriented in a substantially standing position. Thus, the side bars 22a extend generally perpendicularly to the support surface underlying the cart 10, and the feet 22c are oriented substantially parallel to the support surface. In the upright, loading position of the carrier 22, the feet 22c are positioned proximate the support surface underlying the cart 10, e.g., approximately within 1" from the surface, such that the feet 22c are sufficiently adjacent the surface without being obstructed thereby when moving into the upright position. As should be understood, however, the feet 22c may alternatively be positioned to contact the underlying surface in the upright position of the carrier 22.

A standing vertical drum 20 can, therefore, be pushed to slide over and onto the feet 22c, and rest against the side bars 22a and the cross bars 22b, in the upright, loading position of the carrier 22. Once received by the carrier 22, the drum 20 can be secured on the carrier 22 via a securing member 26, to substantially prevent the drum 20 from moving. In the illustrated embodiment, the securing member 26 takes the form of a ratchet strap, but the disclosure is not so limited. The ratchet strap 26 is securely attachable and extendable from one side bar 22a, around the drum 20, and securable to the opposing side bar 22a. The ratchet strap 26 is then tightened around the drum 20 in a manner well understood by those of ordinary skill in the art, to secure the drum 20 on the carrier 22. As should be understood by those of ordinary skill in the art, however, any of numerous different securing means, currently known or that later become known, capable of performing the function of the securing means as described herein, may be utilized. For example, without limitation, the securing member 24 may alternatively comprise an elastic band (not shown), configured to tightly strap around a drum 20 and configured to not rip or tear from the force imparted thereon by the drum 20, having hooks for strapping around the drum 20 and hooking into opposing hooks projecting from the side bars 22a. As another example, without limitation, a releasable locking arm may extend from one side bar 22a, around the drum 20, and releasably lock into a corresponding locking member attached to the opposing side bar 22a, to secure the drum 20 in place. The locking arm can be a flexible metal band which can adapt to the shape of the drum 20 to secure the container in place. Alternatively, the locking arm can be elastic, rubber, or the like provided it is configured to tightly strap around the drum 20 and not to fail from the forces imparted thereon by the drum 20.

After the drum 20 is appropriately secured onto the carrier 22, the carrier 22 is movable back to the horizontal, transport position thereof, such that the drum 20 is loaded onto the cart 10 for transport. This method of loading a drum 20 onto the cart 10 avoids the safety hazard associated with manually lifting and placing a very heavy object onto the cart 10. This method also avoids the need for utilizing additional, external machinery to lift the drum 20 and place it on the cart 10. Once loaded onto the cart 10, another advantage of the cart 10 is an easier transportation of the drum(s) 20 to an upper level of a structure or the roof thereof In the illustrated embodiment, and as shown best in FIGS. 2B, 3B, 4, and 5, the carrier 22 is pivotably attached to the middle section 12b of the frame 12, in a conventional manner. In the illustrated embodiment, the carrier 22 is attached to the middle section 12b at one of the cross bars 22b, such that the respective cross bar 22b is the pivot point of the carrier 22. A motorized drive member 24 is releasably mounted to the middle section 12b at one end thereof and releasably attached to a corresponding carrier 22 at an opposing end thereof. In the illustrated embodiment of FIG. 4, the drive member 24 is mounted to the frame 12 and the corresponding carrier 22 via quick connects 32. Advantageously, therefore, if the motorized drive member 24 fails, the component is easily removable and replaceable.

Figure 5:
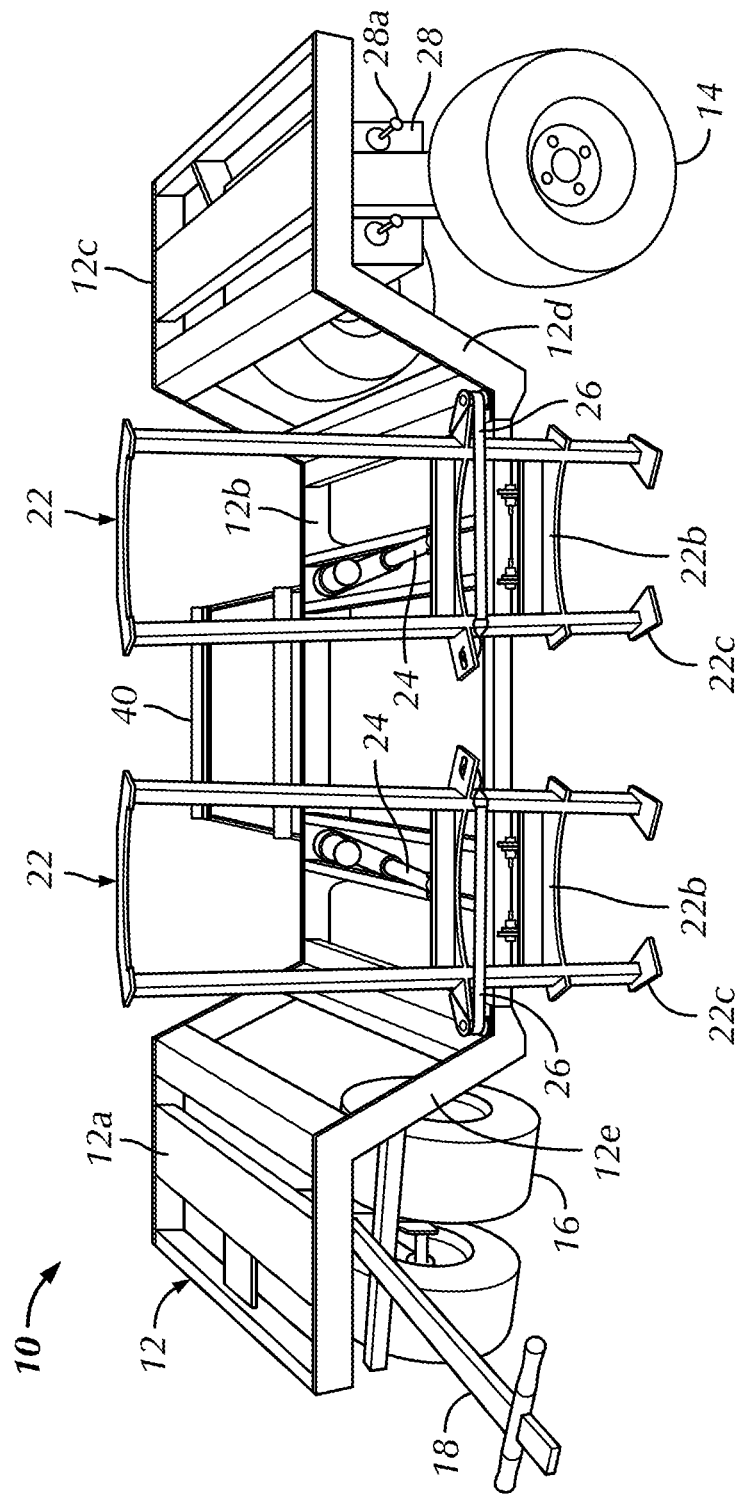
FIG. 5 is a right side perspective view of the mobile cart of FIG. 1, with the carriers thereof oriented in the upright, loading position, prior to loading of drums thereon.

The drive member 24 is configured to move, i.e., pivot, the carrier 22 between the horizontal, transport position and the upright, loading position, in a motorized manner. In the illustrated embodiment, the motorized drive member 24 takes the form of an electric screw-type piston. The piston 24 is rated for approximately 3000 lbs., to ensure capability of safe and repeated movement of the carrier 22 with the 55 gallon drum 20 mounted thereon. As shown best in FIG. 5, each carrier 22 includes a respective, individual electric piston 24 operatively attached thereto for movement of the carrier 22. As also shown in FIG. 5, each electric piston 24 is individually electrically connected to a control box 28. In the illustrated embodiment, the control box 28 is located underneath the rear section 12c, but the disclosure is not so limited. The control box 28 includes an individual controller 28a for actuation of each piston 24. Advantageously, therefore, where a cart 10 includes more than one carrier 22, the carriers 22 may be actuated simultaneously by the respect controllers 28a, if desired.

The control box 28 is powerable by a portable generator (in a conventional manner) that may also be carried by the cart 10. For example, a generator 30a (shown in exemplary FIG. 1 rested atop the rear section 12c) or a generator 30b (shown in exemplary FIG. 1 rested atop the front section 12a) may power the control box 28. Therefore, advantageously, the cart 10 is mobile and self-contained, not requiring a wall outlet. Nonetheless, the control box 28 may also be connected to a wall outlet if one is readily available nearby. As should be understood by those of ordinary skill in the art, the carrier 22 may additionally or alternatively be manually movable between the horizontal, transport position and the upright, loading position. For example, each carrier 22 may include a slidable and retractable member (not shown) that is projectable from an upper end of a carrier 22 to provide an elongated moment/lever arm for manually pivoting the carrier 20 therefrom. Therefore, for example, the carrier 22 may still be utilized in the event of failure of the piston 24 until the piston 24 is repaired or replaced.

In addition to the drums 20, the cart 10 is configured to carry and transport additional equipment utilized with roofing or other applications. For example, a portable mixer and dispenser (not shown) can be carried and transported by the cart 10, along with the drums 20, to a work site. The dispenser may be, as one example, a Reactor portable electric foam sprayer sold by Graco Inc. During transport, the portable mixer and dispenser may be received in a storage box 32 rested atop, and removably secured to (via quick connects as explained further below), either of the front or rear sections 12a, 12c of the cart 10. Alternatively, the portable mixer and dispenser may itself be rested directly atop, and removably secured to, either of the front or rear sections 12a, 12c of the cart 10.

In use, the dispenser is fluidly coupled to a drum 20 and is necessary for properly dispensing the contents therein. As should be understood by those of ordinary skill in the art, the portable mixer and dispenser includes standard connections for connecting the dispenser to the drums 20. The contents in the drums 20 are gravity fed through the connection lines and into the dispenser due to the internal gravimetric pressure within the drums 20. A user typically leaves the dispenser on the cart 10 while dispensing the contents from the drums 20 through the dispenser. If desired or required, a user may disconnect and remove the dispenser from the cart 10. After completing a job, a user may reconnect the dispenser to the cart 10 for easy transportation thereof In one embodiment, the middle section 12b may include a rack 40 pivotably attached to a side of the middle section 12b, pivotable between a stowed position (FIG. 5), extending generally perpendicularly to the middle section 12b, and an extended position (FIG. 1), extending generally parallel to the middle section 12b. Alternatively, the rack 40 may take the form of an underlying sliding rack, which is moveable along an axis generally parallel to the middle section 12b between a stowed position and an extended position. The dispenser may be rested atop the rack 40, and removably secured thereto (via quick connects as explained further below) in the extended position of the rack 40, during dispensing. As should be understood, the sliding/pivotable rack 40 may include a locking member, such as, for example, without limitation, a T-lock, for locking and unlocking of the rack 40 in each of the stowed and extended positions. Due to the lower elevation of the rack 40 relative to the drums 20, and the internal gravimetric pressure within the drums 20, the contents in the drums 20 are gravity fed through connection lines (not shown) to the dispenser. Additionally or alternatively, one or both of the front and rear sections 12a, 12c may also be equipped with similar sliding racks (not shown).

For some applications, an air compressor 34 (FIGS. 1, 3A) is beneficial in conjunction with the dispenser. Accordingly, the cart 10 may also carry an air compressor 34 on either of the front or rear sections 12a, 12c. The air compressor 34 is fluidly connectable to the dispenser in a manner well understood by those of ordinary skill in the art. When an air compressor 34 is used, an air purge type of mixing gun (not shown) is used to mix the two ingredients with air. For some applications, such as, for example, to spray adhesive from the dispenser, a static mixing gun (not shown) is required. Accordingly, in some embodiments, the cart 10 further includes a mixing gun fluidly connected to the dispenser.

As should be understood, any of the aforementioned equipment (or other equipment) carried by the cart 10 on either of the front or rear sections 12a, 12c, or on the aforementioned optional sliding racks, may be removably secured thereto. For example, the equipment may be removably secured to the front or rear sections 12a, 12c (or the sliding racks) via conventional quick connect and disconnect or lock and unlock means. Any of numerous different quick connect and disconnect means know in the art, capable of performing quick connection and disconnection between an item resting atop either of the front or rear sections 12a, 12c and the respective front or rear section 12a, 12c itself, may be utilized. For example, without limitation, a ball and detent pin engageable with corresponding apertures in the front or rear sections 12, 12c, and securing a component of a piece of equipment therebetween, may be utilized.

In use, the cart 10 transports the drums 20 and/or boxes to a work site. A user can selectively load and unload the drums 20 from the cart 10 as described above. A user can also easily remove any of the equipment carried by cart 10 by disconnecting the quick connect attachment to the cart 10. The user may thereafter return the equipment to the cart 10 and secure the equipment thereto via the quick connect attachment. After completion of the job, the user can transport all of the materials and equipment away with the cart 10.

Although the cart 10 has been described in connection with roofing applications, it should be understood by one of ordinary skill in the art that the cart can be used for any desired purpose where containers need to be transported and/or mixed. One non-limiting example of an alternate use for the cart is for transporting and installing spray insulation in homes or buildings.

It will be appreciated by those skilled in the art that changes could be made to the embodiments described above without departing from the broad inventive concept thereof. It is understood, therefore, that this invention is not limited to the particular embodiment disclosed, but is intended to cover modifications within the spirit and scope of the present invention as defined by the appended claims.

I claim:

1. A mobile cart comprising:
   a frame;
   a rotatable and swivelable front pair of wheels attached to and supporting the frame upon an underlying surface;
   a rotatable rear pair of wheels attached to and supporting the frame upon the underlying surface, the front pair of wheels and the rear pair of wheels defining a wheelbase therebetween;
   at least one carrier movably attached to the frame and configured to receive a drum thereon, the carrier comprising:
      a pair of substantially parallel and spaced apart elongate side bars, the side bars each defining a length substantially equal to a length of the drum;
      at least one generally arcuate cross bar extending at least between the side bars, a curvature of the arcuate cross bar generally complementing a contour of the drum; and
      at least one support member projecting from a base end of the carrier to support a standing vertical drum thereon;
      the carrier being movable between a transport position, wherein the carrier is supported upon the frame and the side bars are oriented substantially parallel to the underlying surface, and a loading position, wherein the carrier is oriented generally upright and the side bars thereof are oriented substantially perpendicular to the underlying surface; and
   a corresponding at least one motorized drive member attached to the frame and to the carrier, the motorized drive member being configured, when actuated, to move the corresponding carrier between the transport position and the loading position.

2. The mobile cart of claim 1, wherein the at least one motorized drive member is releasably attached to the frame and releasably attached to the corresponding carrier.

3. The mobile cart of claim 1, wherein the at least one motorized drive member is an electric screw-type piston.

4. The mobile cart of claim 1, wherein the at least one motorized drive member is electrically connected to a corresponding at least one controller to actuate the motorized drive member.

5. The mobile cart of claim 1, wherein the frame comprises a front section and a rear section, the front section and the rear section being substantially planar and extending in substantially the same plane, wherein the front pair of wheels are mounted to an underside of the front section and extend downwardly therefrom and the rear pair of wheels are mounted to an underside of the rear section and extend downwardly therefrom.

6. The mobile cart of claim 5, wherein the front pair of wheels extend downwardly from the front section substantially the same distance as the second pair of wheels extend downwardly from the rear section, such that the cart rests upon the underlying surface in a substantially level horizontal orientation.

7. The mobile cart of claim 5, wherein the frame further comprises a substantially planar middle section connected between the front section and the rear section, the middle section extending in a plane substantially parallel to, and at a lower elevation than, the plane of the front section and the rear section.

8. The mobile cart of claim 7, wherein the at least one carrier is positioned upon the middle section in the transport position.

9. The mobile cart of claim 1, further comprising a handle forwardly extending from the frame, the handle being connected to the frame in a swiveling manner, whereby swiveling of the handle swivels the front pair of wheels.

10. The mobile cart of claim 9, wherein the handle comprises a cross bar engageable with the front pair of wheels by lowering the handle, whereby engagement of the handle cross bar with the front pair of wheels reduces rotation of the front pair of wheels and at least slows down the cart.

11. The mobile cart of claim 1, wherein the rear pair of wheels define a rear track of the cart and the front pair of wheels define a front track of the cart, the rear track being wider than the front track.

12. The mobile cart of claim 1, further comprising a securing member configured to secure the drum to the carrier, the securing member being attachable and extendable from one side bar of the pair of side bars, around the drum and securable to the other side bar of the pair of side bars.

13. The mobile cart of claim 1, further comprising a rack movably attached to the frame between a stowed position and an extended position, the rack being configured to support items thereon in the extended position.

14. The mobile cart of claim 1, wherein the at least one carrier is pivotably attached to the frame.

15. The mobile cart of claim 1, wherein the at least one support member comprises a foot extending substantially perpendicularly from a base end of each side bar.

16. The mobile cart of claim 1, wherein the at least one support member is positioned within approximately one inch of the underlying surface in the loading position of the carrier.

17. The mobile cart of claim 1, wherein the frame is constructed of steel.

18. The mobile cart of claim 1, in combination with a drum supported on the carrier, wherein the drum is a 55 gallon drum.

19. The mobile cart of claim 1, in combination with a portable power supply supported upon the frame and connected with the at least one motorized drive member.

20. The mobile cart of claim 1, in combination with an air compressor supported upon the frame.

* * * * *